Patented May 17, 1932

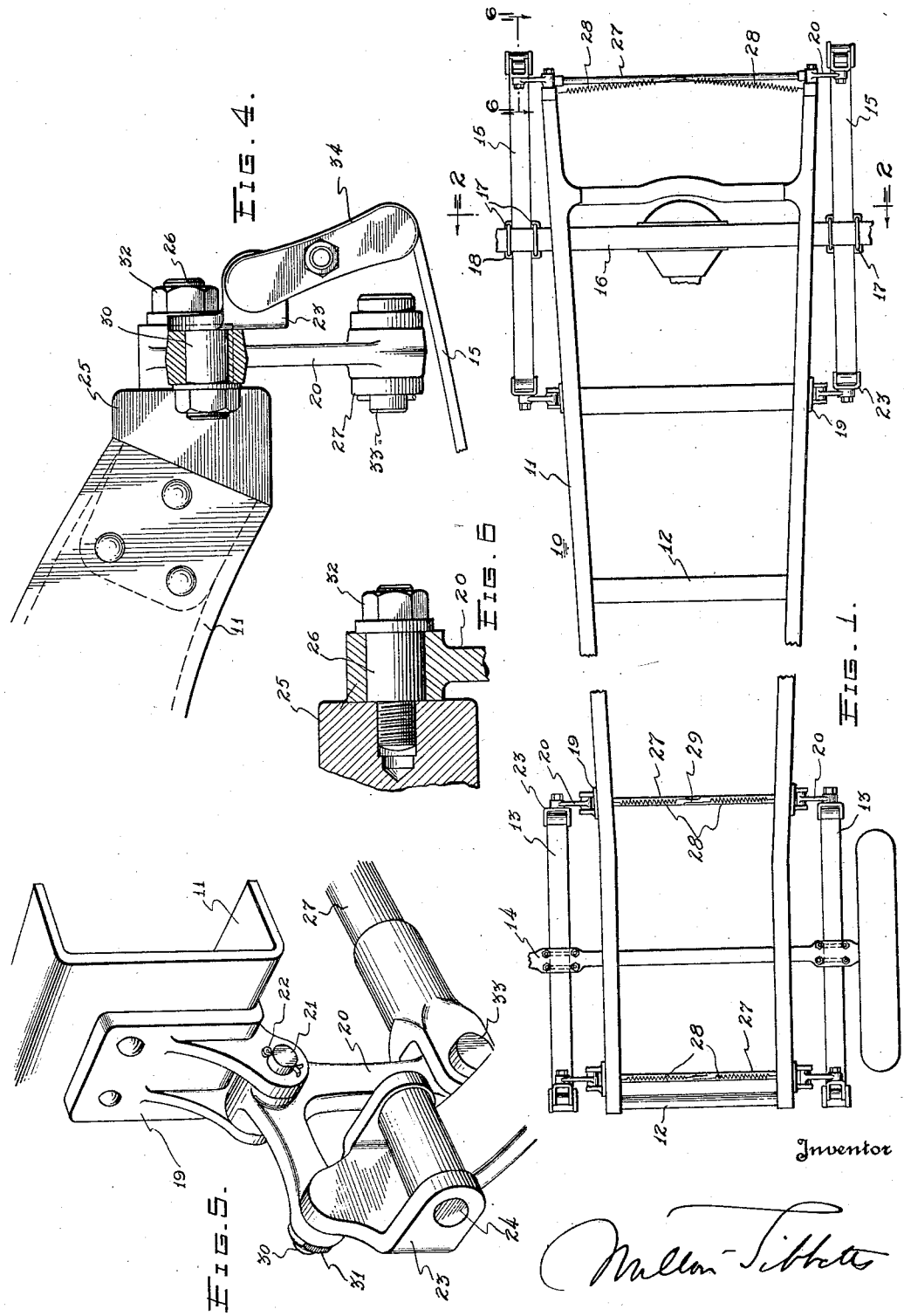

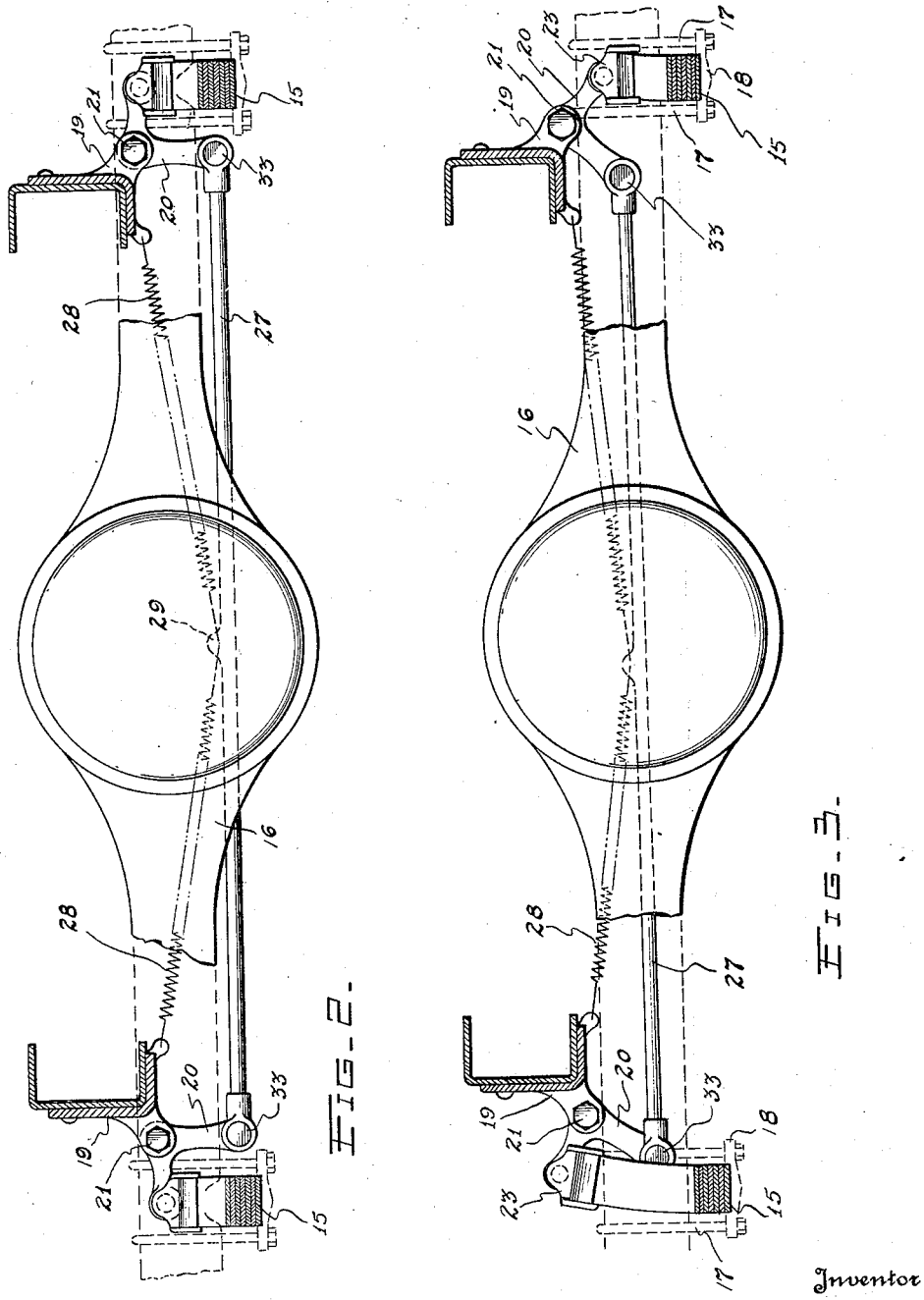

1,859,182

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 31, 1929. Serial No. 403,862.

This invention relates to motor vehicles, and more particularly to supporting means for the frame.

The body of a motor vehicle is usually fixed to the frame which is resiliently supported upon springs secured to the axles. The springs are connected to the frame in a manner such that when the direction of vehicle travel is changed, there is a resulting listing of the body relative to the plane of the axles. Such movement of the body is objectionable to the occupants of the motor vehicle, and an object of my invention is to overcome this objectionable characteristic by providing mechanism which will maintain the body in a substantially parallel relation with the axles at all times.

Another object of the invention is to provide a motor vehicle in which the riding qualities are improved.

A further object of the invention is to provide a motor vehicle in which the springs on opposite sides of the frame are connected with each other and with the frame and axles in a manner to maintain the body parallel with the axles.

These and other objects of the invention will appear from the following description taken in connection with the drawings, which form a part of this specification, and in which:

Fig. 1 is a plan view of a motor vehicle chassis having my invention incorporated therewith, Fig. 2 is a sectional view of the same taken on line 2—2 of Fig. 1, illustrating the normal position of one of the supporting means associated with the frame and the axle, Fig. 3 is a similar view showing the position of the body and the supporting means relative to the axle during a change in direction of the vehicle travel, Fig. 4 is a fragmentary side elevation, partially in section, showing the rear connection between the body and one of the springs, Fig. 5 is a fragmentary perspective view of one of the connections between the frame and an end of one of the springs, and Fig. 6 is a sectional view taken on line 6—6 of Fig. 1.

Referring now to the drawings by characters of reference, 10 designates generally the frame of a motor vehicle which is of a conventional type, and includes side rails 11 and cross members 12. The body (not shown) of the motor vehicle is fixed to and carried by the frame in the usual manner. A pair of longitudinally extending springs are arranged at the forward and rear ends of the frame, the forward pair of springs 13 being fixed centrally to the front axle 14, while the rear pair of springs 15 are fixed centrally to the rear axle 16 by bolts 17 and brackets 18.

In order to maintain the frame in parallel relation with the axles, I connect the spring ends to the frame and to each other in a manner which I will now describe. To the side rails of the frame are welded brackets 19, while a horn 25 is fixed to the rear end of the side rails. A bell crank 20 is pivotally carried by each of the brackets and horns in a manner such that there can be only lateral pivotal movement thereof. The bell cranks associated with the brackets are carried on pins 21 which are retained by cotter keys 22, and the bell cranks associated with the horns are carried on studs 26 and retained by nuts 32, such studs being attached to the horns.

The bell cranks are normally positioned with one arm extending laterally and the other arm depending from the frame. To the lateral extending bell crank arms are associated hangers 23, such hangers having a pin extension 30 which extends through the lateral arm of the associated bell crank and one secured by nuts 31. A spring shackle 34 is carried by the front and rear hangers and a pin 24 extends through ears on the center hangers. The ends of the master leaf of the springs 13 and 15 are connected to the shackles and the pins 24. It will be seen that the hangers are pivotally mounted upon the lateral bell crank arms so that they can rotate.

In order to cause corresponding bell cranks on opposite sides of the frame to move in unison, I provide tie rods 27, the ends of which are pivoted to the depending bell crank arms by the pins 33. A pair of coil springs 28 are secured centrally to a boss 29 on each rod, and the other ends are secured to the side rails of the frame, however such springs are not requisite to the functioning of the connections. The coil springs tend to maintain the frame centrally of the axles and oppose lateral movement of the frame relative to the axles.

When the vehicle is steered to the right or left the inertia forces tend to cause the body to continue movement in the former direction of travel and with the conventional suspension the frame and body will list. With the suspension connections herein described, the body will not list but will move in a vertical and lateral direction substantially parallel however with the axles. The relation of the body to the axles and that which the connections assume when turning to the left can be seen in Fig. 2 of the drawings. When the herein described invention which materially aids comfortable riding, is associated with a motor vehicle, the occupants will not be subjected to body tilting.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What I claim is:

1. In a motor vehicle, a frame, an axle, a pair of parallel springs fixed to the axle, a laterally movable pivoted connection between each spring end and the frame, and a link member connecting similar parallel connections.

2. In a motor vehicle, a frame, an axle, a pair of parallel springs fixed to the axle, a laterally movable pivoted connection between each spring end and the frame, a link member connecting similar parallel connections, and spring means connected between the frame and the link opposing lateral movement of the frame relative to the axle.

3. In a motor vehicle, a frame, axles, a pair of parallel springs fixed to each axle, laterally movable pivoted connections intermediate the frame and each end of the springs, and rods extending transversely of the frame and pivoted at their ends to parallel connections on opposite sides of the vehicle.

4. In a motor vehicle, a frame, axles, a spring fixed to each end of the axles, means including bell cranks movable only in transverse planes connecting all the spring ends with the frame, and a rod extending between similarly arranged bell cranks on opposite sides of the frame and pivotally connected thereto.

5. In a motor vehicle, a frame, axles, a spring fixed to each end of the axles, laterally movable pivoted connections between each end of the springs and the frame, and means whereby the corresponding pivoted connections on opposite sides of the vehicle move uniformly.

6. In a motor vehicle, a frame, axles, a spring fixed to each end of the axles, a laterally movable pivoted connection including a bell crank between each spring end and the frame, and a rod pivoted to the similarly arranged bell crank on opposite sides of the frame.

7. In a motor vehicle, a frame, axles, a spring fixed to each end of the axles, bell cranks pivoted to the frame adjacent each end of the springs, means connecting all the spring ends with the adjacent bell crank arms, and rods extending between and pivotally connecting each pair of bell cranks on opposite sides of the frame.

8. In a motor vehicle, a frame, axles, a spring fixed to each end of the axles, and a connection between each of the spring ends and the frame, said connections consisting of elements movable in parallel, lateral and vertical planes.

9. In a motor vehicle, a frame, axles, a spring fixed to each end of the axles, a connection between each of the spring ends and the frame, said connections consisting of elements pivoted to move in parallel, lateral and vertical planes, and a link between each pair of connections on opposite sides of the frame causing them to move laterally in unison.

10. In a motor vehicle, a frame, axles, a spring fixed to each end of the axles, a connection between each of the spring ends and the frame, said connections each consisting of elements pivoted to move in parallel, lateral and vertical planes, a rod between each pair of connection elements on opposite sides of the frame, and spring means restraining lateral movement of the body.

11. In a motor vehicle, a frame having side sills, an axle, a pair of springs fixed at corresponding portions thereof to the axle, a pair of oppositely disposed corresponding lugs on the frame, a pair of bell cranks pivotally engaged with the lugs, one of the arms of each crank extending in a horizontal direction and the other in a vertical direction, connections on one end of the springs pivotally engaged with the horizontally extending arm of each bell crank, a rod connecting the vertically extending arms of each bell crank, another pair of oppositely disposed lugs on the frame side sills, a lug on the rod substantially at its midpoint and a pair of springs connecting the lugs on the frame side sills with the lug on the rod.

12. In a motor vehicle including a frame, an axle, and a pair of springs fixed to the axle extending in parallel relation to each other, means for limiting sidesway of the vehicle body comprising a laterally movable pivoted connection between each spring end and the frame and a link member connecting oppositely disposed connections on each side of the frame, the connections and links being adapted on displacement of the body sideways, by centrifugal force or the like, to depress the outer springs and raise the inner springs to maintain the body of the vehicle level.

In testimony whereof I affix my signature.

MILTON TIBBETTS.